United States Patent
Galai et al.

(10) Patent No.: US 10,693,981 B2
(45) Date of Patent: *Jun. 23, 2020

(54) PROVISIONING PERSONALIZED CONTENT RECOMMENDATIONS

(71) Applicant: Outbrain Inc., New York, NY (US)

(72) Inventors: Yaron Galai, New York, NY (US); Roy Bass, Herzliya (IL); Colin Doody, New York, NY (US); Yaniv Gilad, New York, NY (US); Daniel Stern Sternlicht, Netanya (IL); Ido Tamir, Hod Hasharon (IL)

(73) Assignee: Outbrain Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/119,262

(22) Filed: Aug. 31, 2018

(65) Prior Publication Data

US 2018/0375949 A1    Dec. 27, 2018

Related U.S. Application Data

(63) Continuation of application No. 14/657,457, filed on Mar. 13, 2015, now Pat. No. 10,165,069.
(Continued)

(51) Int. Cl.
*G06F 15/16*     (2006.01)
*H04L 29/08*    (2006.01)
(Continued)

(52) U.S. Cl.
CPC .......... *H04L 67/22* (2013.01); *G06F 16/9535* (2019.01); *G06Q 30/02* (2013.01); *G06Q 50/01* (2013.01); *H04L 67/306* (2013.01)

(58) Field of Classification Search
None
See application file for complete search history.

(56) References Cited

U.S. PATENT DOCUMENTS

2003/0014407 A1    1/2003  Blatter et al.
2005/0123135 A1    6/2005  Hunt et al.
(Continued)

OTHER PUBLICATIONS

Office Action for U.S. Appl. No. 14/657,457 dated Jun. 27, 2017, 10 pages.
(Continued)

*Primary Examiner* — Mohamed Ibrahim
(74) *Attorney, Agent, or Firm* — Lowenstein Sandler LLP

(57) ABSTRACT

A personalized content recommendation provisioning method and system are described, according to various implementations. In an implementation, a user profile is established for each of multiple users within an electronic data environment (e.g., the Internet). The user profile may include information collected via a registration of the user and information identifying content consumed by the user based at least in part on information collected by an associated tracking cookie. The user profile may be used to generate a personalized grade associated with each of multiple candidate content recommendations in a high-quality candidate content recommendation pool, determine a content recommendation scope associated with a user in view of a personalized grade associated with each of the plurality of candidate content recommendations, and display the content recommendation scope to the user.

20 Claims, 14 Drawing Sheets

Related U.S. Application Data

(60) Provisional application No. 61/954,928, filed on Mar. 18, 2014.

(51) Int. Cl.
  G06Q 30/02 (2012.01)
  G06F 16/9535 (2019.01)
  G06Q 50/00 (2012.01)

(56) References Cited

U.S. PATENT DOCUMENTS

| | | | |
|---|---|---|---|
| 2007/0064626 A1* | 3/2007 | Evans | G06F 16/958 370/254 |
| 2008/0005313 A1 | 1/2008 | Flake et al. | |
| 2009/0083225 A1 | 3/2009 | Jacobs et al. | |
| 2010/0185866 A1 | 7/2010 | Wang et al. | |
| 2012/0066073 A1* | 3/2012 | Dilip | G06Q 30/0269 705/14.66 |
| 2013/0030907 A1* | 1/2013 | Lyon | G06Q 30/0246 705/14.42 |
| 2013/0086380 A1 | 4/2013 | Krishnaswamy et al. | |
| 2014/0032912 A1 | 1/2014 | Hardy et al. | |
| 2014/0046965 A1 | 2/2014 | Tian et al. | |
| 2014/0279736 A1* | 9/2014 | Glass | G06Q 30/0282 706/12 |
| 2014/0316930 A1* | 10/2014 | Jain | G06F 16/9535 705/26.5 |
| 2015/0006280 A1 | 1/2015 | Ruiz et al. | |
| 2015/0120722 A1 | 4/2015 | Mart N Mart Nez et al. | |

OTHER PUBLICATIONS

Office Action for U.S. Appl. No. 14/657,457 dated Jan. 8, 2018, 17 pages.

Advisory Action for U.S. Appl. No. 14/657,457 dated Mar. 30, 2018, 3 pages.

Notice of Allowance for U.S. Appl. No. 14/657,457 dated Jul. 18, 2018, 9 pages.

Notice of Allowance for U.S. Appl. No. 14/657,457 dated Aug. 2, 2018, 3 pages.

* cited by examiner

FIG. 5

From Around the Web

- 14 Totally Nice Gestures Men Do That Are Lowkey Creepy
- Apple CEO Tim Cook Blasted
- Understanding Customer Loyalty: The 4 Types of Customers
- Cops: Jilted Suitor Tried to Frame Rival in Bomb Scares
- DNA Testing Shows Michelle Obama Had White Relatives. What It Could It Reveal to You?

More Recommendations

- 'Eden': Story of a slave in the U.S.
- The photos North Korea didn't want you to see
- We don't need another billion people
- Sandra Bullock and son Louis are looking skeletal
- Republicans got what they wanted
- Open Source Solves J.K. Rowling Mystery Sort Content by Topic

FIG. 12

Selected Content for Yaron Galai

From Around the Web

- Is Bill Murray's Elite Cover Do That Are Interrupts Media Hub
- Understanding Customer Loyalty: The 4 Types of Customers
- Cops: Jilted Suitor Tried to Frame Rival in Bomb Scares
- DNA Testing Shows Michelle Obama Had White Relatives. What It Could Reveal to You?

More Recommendations

- 'Eden': Story of a slave in the U.S.
- The photos North Korea didn't want you to see
- We don't need another billion people
- Sandra Bullock and son Louis are looking skeletal
- Open Source Solves J.K. Rowling Mystery Sort Content by Topic   Finance   Careers   Science Recommended by

PROVISIONING PERSONALIZED CONTENT RECOMMENDATIONS

CROSS-REFERENCE TO RELATED APPLICATIONS

This application is a continuation of U.S. patent application Ser. No. 14/657,457, filed on Mar. 13, 2015, which claims the benefit of U.S. Provisional Application No. 61/954,928, filed on Mar. 18, 2014. U.S. patent application Ser. No. 14/657,457 and U.S. Provisional Application No. 61/954,928 are hereby incorporated by reference herein in their entireties.

TECHNICAL FIELD

The present disclosure relates to content recommendation networks, and more particularly, to provisioning of content recommendations to users in an electronic environment.

BACKGROUND

In the electronic content publishing industry, it is desirable for a content publisher (e.g., a website provider) to present users not only with content in an initial form (e.g., a webpage), but also provide users of that content with additional "recommended" content. In this regard, it should be a goal of the content publisher to provision personalized content recommendations that are interesting, trustworthy, and relevant to the user. This will have the effect of increasing the user's consumption of the recommended content, achieving a higher level of user engagement while increasing the content publisher's revenue.

BRIEF DESCRIPTION OF THE FIGURES

The present disclosure will be understood more fully from the detailed description given below and from the accompanying drawings of various implementations of the disclosure.

FIG. 5 is an exemplary screenshot of a content recommendation widget (pre-registration), in accordance with various implementations.

FIG. 12 is an exemplary screenshot of a content recommendation widget (post-registration), in accordance with various implementations.

DETAILED DESCRIPTION

A personalized content recommendation provisioning method and system are described, according to various implementations. In an implementation, a user profile is established for each of multiple users within an electronic data environment (e.g., the Internet). The user profile may include information identifying content consumed by the user based at least in part on information collected by an associated tracking cookie (also referred to as the "user activity"). The multiple user profiles and corresponding user activity may be used to map and store aggregated data relating to user content consumption activities, interests and preferences across multiple content networks.

In an implementation, multiple sets of high-quality content recommendation candidates are identified. The sets, also referred to as "candidate content recommendation pools" may be associated with a measurement of user trust (also referred to as a "long-term user trust measure." In an implementation, the system may include a module (herein the "content recommendation personalization module") configured to analyze the user profile and one or more content recommendation scopes to identify or generate one or more personalized content recommendations from the content recommendation candidate pools for each user across multiple content serving locations and content usage profiles. The content recommendation personalization module may be a software component (e.g., a set of instructions residing in a memory) executable by one or more processing devices to perform the personalized content recommendation generating activities described herein (e.g., the methods described in detail in connection with FIGS. 3-4).

Figure 1:
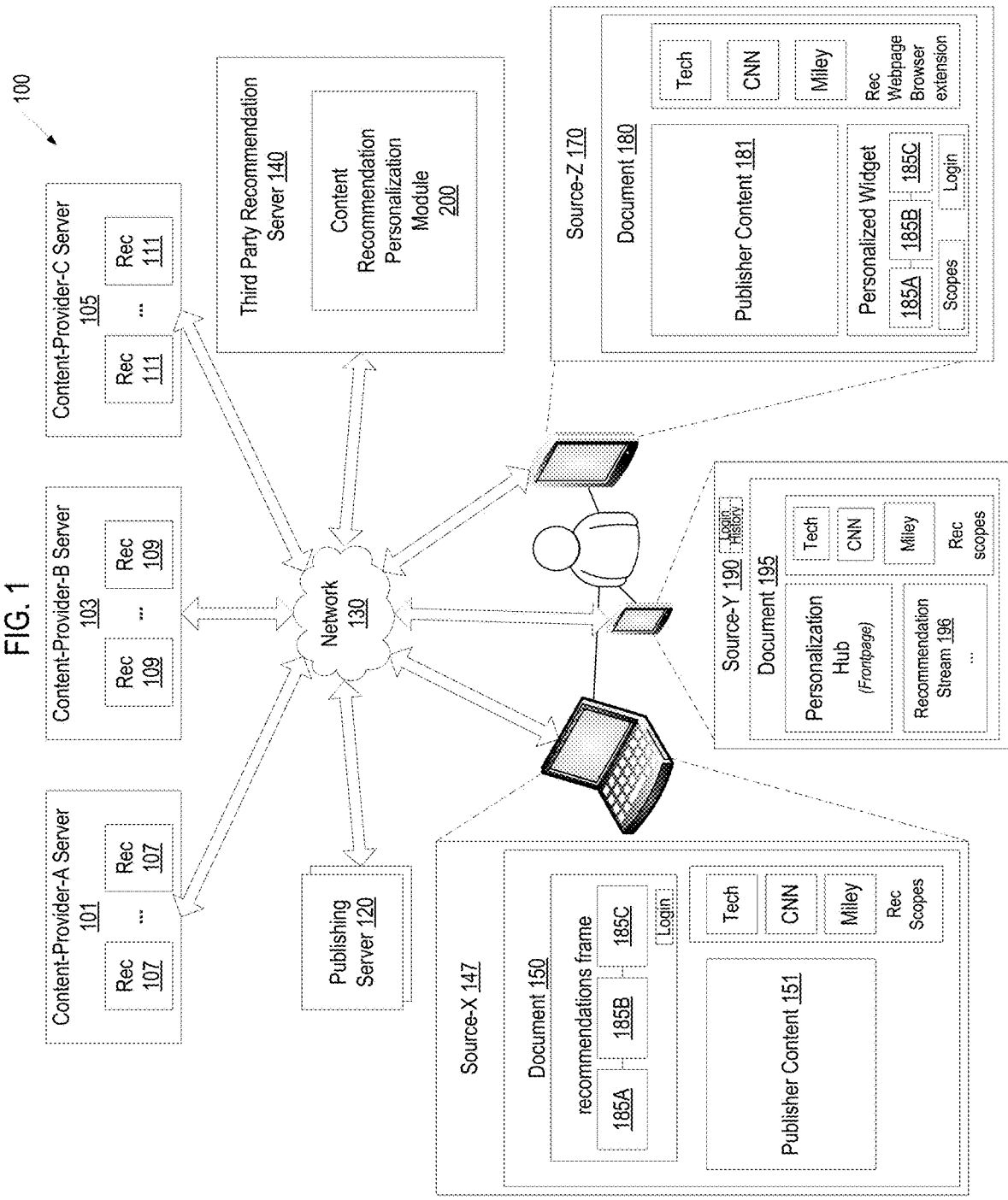
FIG. 1 illustrates an example system architecture in which examples of the present disclosure can be implemented.

FIG. 1 illustrates an example system architecture 100 in which examples of the present disclosure can be implemented. The system architecture 100 can include one or more target user devices 160A, 160B, 160C, one or more content provider servers 101, 103, 105, one or more destination servers (e.g., publishing servers 120) and one or more third party recommendation servers 140 coupled to each other over one or more networks 130.

Content providers may have content recommendations (e.g., content recommendations 107, 109, 111) they wish to have displayed, for example, in a publisher document (e.g., document 150, 180). A document 150, 180, 195 may be for example, and is not limited to a website homepage, section front, webpage, mobile application user interface (UI), gaming application UI, television application UI, etc. For example, a content provider 101, 103, 105 may have multiple candidate content recommendations 107, 109, 111 that the content provider makes available for provisioning to a target user via a document 150, 180, 195 (e.g., SportsNews webpage, a BaseballNews webpage) of a source (e.g., Source-X 147, Source-Y 190, Source-Z 170). A candidate content recommendation 107, 109, 111 can be a representation of digital content. Digital content can include, for example, such as, and not limited to, an article, a web blog entry, a social media posting, a data feed, an advertisement, a document (e.g., webpage), digital video, digital movies, digital photos, digital music, social media updates, electronic books (ebooks), electronic magazines, digital newspapers, digital audio books, electronic journals, electronic comic books, software applications, etc. Each content provider can have multiple candidate content recommendations 107, 109, 111 considered by a content recommendation personalization module 145 of a third party recommendation server 140 as a candidate for provisioning to one or more target users.

A content recommendation host or "publisher" hereinafter refers to an entity and platform hosting destination documents (e.g., webpages, mobile application graphical user interfaces (GUIs), gaming application GUIs, television application GUIs, etc.) that include content recommendations 107, 109, 111 of the content providers 101, 103, 105. For example, SportsNews, Inc. and BaseballNews, Inc. may be publishers. The publisher platforms can include publishing servers 120. The publisher servers 120 can be application servers that provide one or more applications (e.g., web application, mobile application, desktop application, gaming console applications, television console application, etc.). The publishing servers 120 can be coupled to one or more data stores that store publisher data and/or content recommendations of content providers.

According to implementations, the publishers' destination documents 150, 180, 195 can be rendered with the content recommendations 107, 109, 111 of the content providers in user devices using for example, an application (e.g., web browser, mobile application, desktop application, gaming application, television application, etc.) on the user device.

A document 150, 180 can be within a source 147, 170. The source 147, 170 may include, but is not limited to, a publisher's website, a publisher's mobile application, publisher's gaming application, publisher's television application, etc. A destination document 150, 180 can include publisher content (e.g., publisher content 151, 181). For example, the SportsNews website (e.g., source 147) can include a webpage (e.g., document 150) that contains an article about a baseball game (e.g., publisher content 151).

The content providers may wish to publish their respective content recommendations 107,109,111 in widespread locations (e.g., document 150, document 180, document 195) in a variety of different ways. In an implementation, the source may maintain a content recommendation frame (e.g., Source-X 147) including one or more content recommendation opportunities 185A, 185B, 185C). In an implementation, the source may maintain a content recommendation frame (e.g., Source-Z 170) including a personalized widget having one or more content recommendation opportunities 185A, 185B, 185C. In an implementation, the source may include a personalization hub (or frontpage) having an associated content recommendation stream 196 for presenting one or more content recommendations to a user.

The content providers can use the service hosted by the third party content recommendation service provider to have the content recommendations 107, 109, 111 of the content providers served to populate the content recommendation opportunities in the publisher documents 150, 180, 195. The publishers (e.g., SportsNews Inc., BaseballNews, Inc.) can use the service hosted by the third party content recommendation service provider to receive content recommendations 107, 109, 111 to populate the content recommendation opportunities 185A, 185B, 185C, 196 in their respective publisher documents 150, 180, 195.

The third party content recommendation service provider can host one or more third party content recommendation servers 140 to provide the service to the content providers and publishers. The servers 140 include the content recommendation personalization module 145 configured to generate one or more personalized content recommendations for provisioning for a target user via a source 147, 170, 190. The content recommendation personalization module 145 is a software component (e.g., a set of instructions residing in a memory) executable by one or more processing devices to perform the personalized content recommendation generating activities described herein (e.g., the methods described in detail in connection with FIGS. 3-4). The instructions of the content recommendation personalization module 145 may reside in a memory including any suitable computer readable storage medium, such as volatile memory devices (e.g., random access memory (RAM), non-volatile memory devices (e.g., flash memory), a magnetic hard disk, a Universal Serial Bus (USB) solid state drive, a local disk, an external disk, and/or other types of memory devices).

The network of content providers can include, for example, several hundred thousand candidate content recommendations 107,109,111 that may be stored in one or more data stores that are coupled to the network 130. The architecture 100 can include, for example, several hundred publisher documents 150,180, 195 that are accessed by multiple users on various user devices.

For example, document 150 may have three content recommendation opportunities 185A, 185B, 185C for provisioning a personalized content recommendation for the target user. When the target user accesses the particular document 150, the content recommendation personalization module 145 can generate a set of personalized content recommendations to populate the content recommendation opportunities in document 150. As each target user accesses a document 150,180, 195, the content recommendation personalization module 145 can determine one or more personalized content recommendations associated with the particular target user, in accordance with the methodologies described in detail below.

The network 130 can include one or more local area networks (LAN), one or more wireless networks, one or more mobile communications networks, one or more wide area networks (WAN), such as the Internet, or similar communication systems, or combinations of such. The networks 130 can include one or more networking and/or computing devices such as wired and wireless devices. In one implementation, not all servers 101,103,105,120,140, and/or user devices 160A-B-C are directly connected to each other. The networks 130 may be separate networks.

The servers 101,103,105,120,140 can be hosted on one or more machines. The machines can include for example, and are not limited to, any data processing device, such as a desktop computer, a laptop computer, a mainframe computer, a personal digital assistant, a server computer, a handheld device or any other device configured to process data.

A user device can be a computing device such as a server computer, a desktop computer, a set-top box, a gaming console, a television, a portable computing device such as, and not limited to, mobile telephones, personal digital assistants (PDAs), portable media players, netbooks, laptop computers, an electronic book reader, wearable electronic devices and the like. For example, a user device may be a laptop computer, a tablet computer or a smartphone.

According to embodiments of the present disclosure, the source may be implemented as a web page (e.g., a content recommendation personalization hub or frontpage) accessible by a user (e.g., Source-Y 190) and/or a web application (e.g., a content recommendation widget as shown in Source-Z 170, a web frame (e.g., the content recommendations frame of Source-X 147), a web browser extension, a mobile app, etc.) for allowing users to access, read and customize personalized content recommendations.

Figure 13:
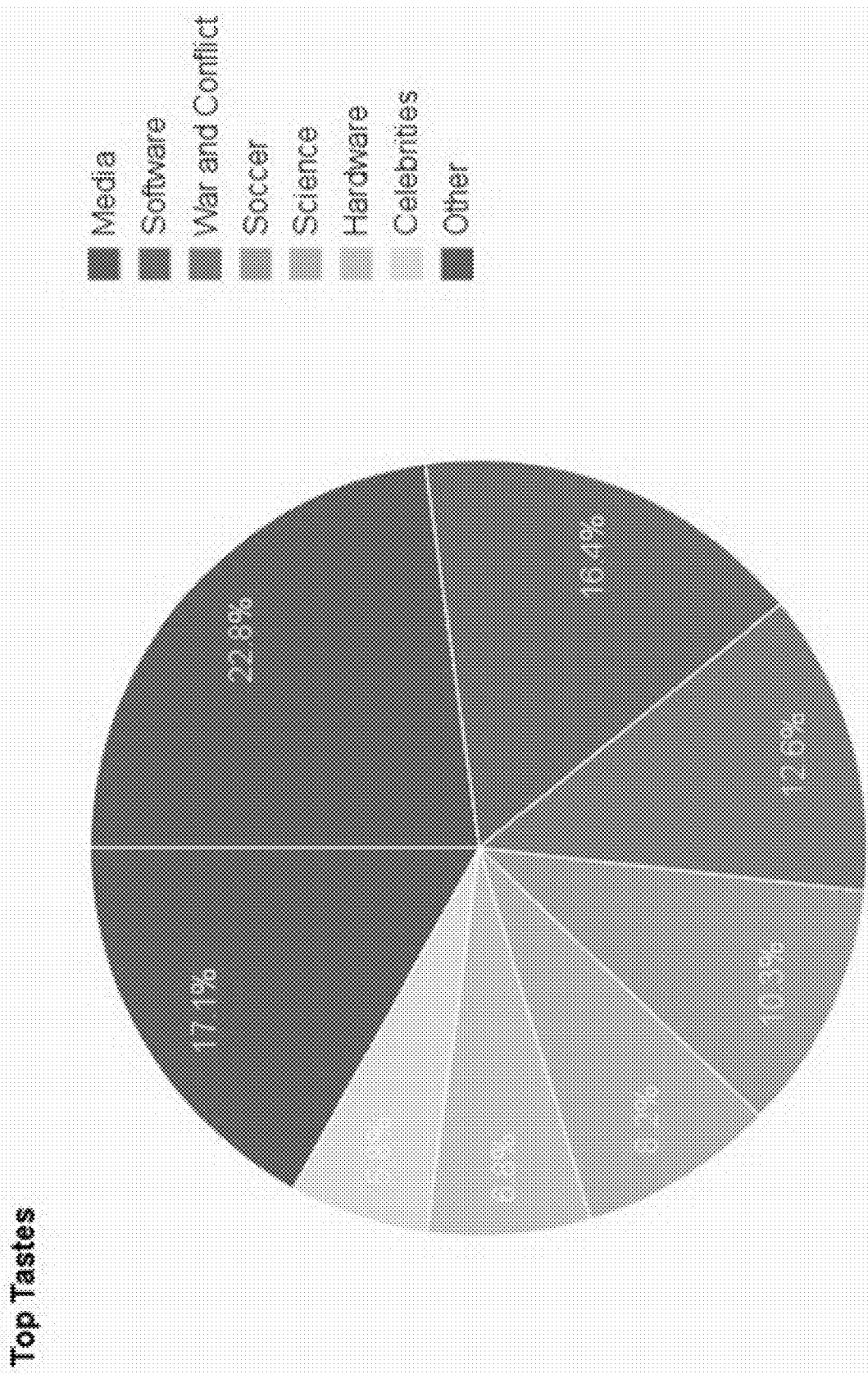
FIG. 13 is an exemplary screenshot of a user content taste profile graph, in accordance with various implementations.

In an embodiment of the present disclosure, the user profile (or user content identity profile) and an associated tracking cookie are used to track, map and store user data relating to a user's electronic or web-based content consumption across the web and multiple devices associated with the user. The user cookie tracks the user's implicit usage (e.g., documents actually read by the user) and provides data about the user's explicit choices (e.g., a user's choice of one or more content recommendation scopes). In an implementation, the user cookie may also be used to store the user's profile, including data about content the user has read and liked. In an implementation the user's tracked content consumption data can be mapped and stored as a user taste profile graph indicating the relative percentage of content types consumed by the user, as shown in FIG. 13.

In an implementation, to ensure the user's privacy, the cookie may not include any personally identifying information. A UUID (universally unique identifier) number is generated and assigned to the user tracking cookie and is subsequently reused (rewritten to the user's cookie) by the user content identity profile upon user registration.

In an implementation, the user may register with the system. Registering with the system provides the user with a consistent reading experience across the web, devices, geographical location, and time of day. For example, duplicate content recommendations to the same user may be avoided if a user is registered and/or logged in to the system. In an implementation, registration also enables the user to be notified about and sign up for additional content recommendation services. In another embodiment the user profile data can be stored on and accessed from a secure third party content recommendation server. In another embodiment the user can login to the personalized hub homepage using a third-party user identity (e.g., a facebook.com or twitter.com user login).

As shown in FIG. 1, the source may present one or more content recommendation scopes to a user. A content recommendation scope is a grouping of content used to organize and/or constrain the served content recommendation entities based on one or more content characteristics (e.g., a source of the content, a category associated with the content, a topic of the content, an author of the content, an algorithm type, etc.). In implementations, each content recommendation scope is associated with one or scoped content recommendations identified in accordance with the aspects of the present disclosure.

Figure 2:
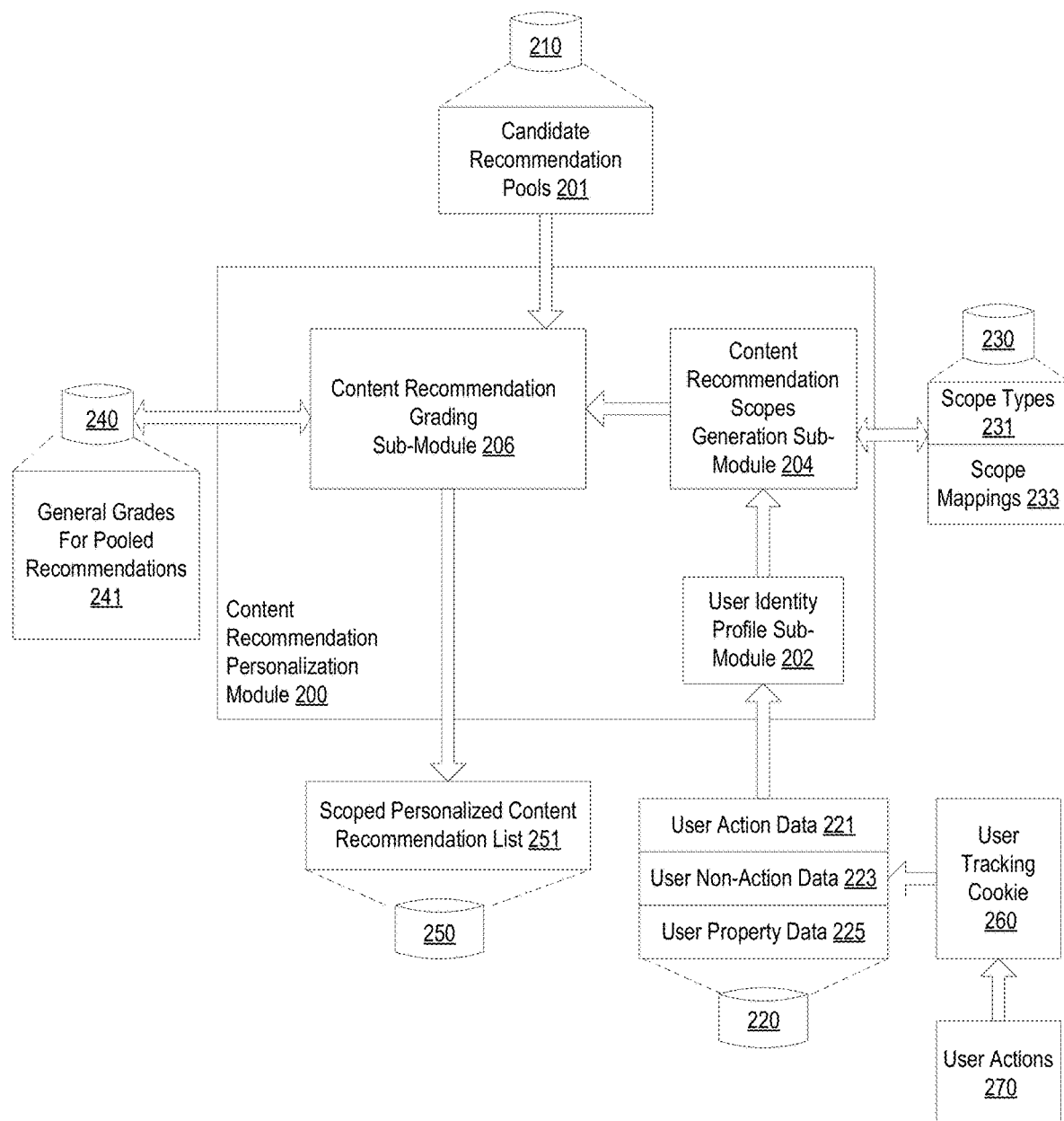
FIG. 2 is a block diagram of a content recommendation personalization module, in accordance with various implementations.

FIG. 2 is a block diagram of a content recommendation personalization module 200 (e.g., content recommendation personalization module 145 of FIG. 1), in accordance with various implementations of the present disclosure. The content recommendation personalization module 200 can include a user identify profile sub-module 202, a content recommendation scopes generation sub-module 204, and a content recommendation grading sub-module 206. Note that in alternative implementations, the functionality of one or more of the user identify profile sub-module 202, the content recommendation scopes generation sub-module 204, and the content recommendation grading sub-module 206 may be combined or divided. Note that in alternative implementations, the functionality of the content recommendation personalization module 200 can be separate modules.

The content recommendation personalization module 200 can be coupled to one or more data stores 210, 220, 230, 240, 250 that store data. The data stores 210, 220, 230, 240, 250 can be persistent storage units. A persistent storage unit can be a local storage unit or a remote storage unit. Persistent storage units can be a magnetic storage unit, optical storage unit, solid-state storage unit, electronic storage unit (main memory), or a similar storage unit. Persistent storage units can be a monolithic device or a distributed set of devices. A 'set', as used herein, refers to any positive whole number of items.

The data stores 210, 220, 230, 240, 250 can store input and/or output data. The modules (e.g., the user data collection sub-module 202, the cluster generation sub-module 204, and the content recommendation grading sub-module 206) can be coupled to the one or more data stores 210, 220, 230, 240, 250 and can read from and write to the one or more data stores 210, 220, 230, 240, 250.

Data store 210 can store candidate content recommendation pools 201 identified by the content recommendation personalization module 200. The candidate content recommendation pools 201 may be considered by the content recommendation personalization module 200 in formulating the personalized content recommendations for the one or more target users. In an implementation, a candidate content recommendation pool 201 may be a representation of digital content. According to implementations of the present disclosure, the candidate content recommendation(s) in the content recommendation pools can include, for example, and is not limited to, one or more text, links, thumbnails, images, icons, etc.

According to implementations of the present disclosure, data store 220 is configured to store user data collected by the user identity profile sub-module 202. The user data may include user action data 221, user non-action data 223 and user property data 225. The user data may be collected for any quantity of users via any suitable methodology. For example, user-specific data from multiple users may be collected by the user identity profile sub-module 202 by storing a user identifier (e.g., a cookie stored on the user's browser) and/or using a user login (e.g., wherein a user is associated with login credentials which enable the collection of user data for that user across multiple devices and browsers).

According to implementations of the present disclosure, user action data 221 may include any data associated with a user's electronic actions or activity including, but not limited to, page visits, clicks on a widget or application, scrolling of webpage sections, pointing device (e.g., mouse or keyboard) movements, clicks or other indications, a time of activity on a webpage and/or web site, a listing of web sites visited by a user, languages a user reads, special interest indicators such as "like" indications or "dislike" indications, user explicit data such as categories, etc.

According to implementations, user non-action data 223 includes passively generated data including, but not limited to, social data associated with a user from a social network, viewing a content link (e.g., a content recommendation) but not interacting with the link, other personal data associated with the user, etc.

According to implementations, user property data 225 includes properties associated with a user including, but not limited to, a geographic location of a user, document properties associated with documents viewed by a user (e.g., document categories, document size, estimated document reading time), content type or format (e.g., video, slideshows, audio, articles, games, etc.), etc. The user property data 225 collected by the content recommendation module 200 may further include registration information, personal information, and/or demographic information pertaining to users and/or groups of users (e.g., age of user groups, geographic location of user groups) and may store the information in one or more data stores (e.g., hard disks, memories, databases, etc. like data store 220). In situations in which the implementations discussed herein collect personal information and/or demographic about users, or may make use of personal information and/or demographic information, the user may be provided with an opportunity to control whether the content recommendation module 200 is allowed to collect the information (e.g., information about a user's social network, social actions or activities, profession, a user's preferences, or a user's current location), or to control whether and/or how to receive content from the content sharing platform that may be more relevant to the user. In addition, certain data may be treated in one or more ways before it is stored or used, so that personally identifiable information is removed. Thus, the user may have control over how, when, and what type of information is collected about the user and used by the content recommendation module 200.

In an implementation, user actions 270 are tracked using a user tracking cookie 260 in order to identify user action data 221, user non-action data 223, and/or user property data 225.

According to implementations of the present disclosure, the content recommendation scopes generation sub-module 204 is configured to generate one or more content recommendation scopes (e.g., a collection of one or more scoped content recommendations). According to implementations, the content recommendation scopes generation sub-module 204 may generate any suitable quantity of content recommendation scopes, as described below in detail with regard to FIG. 3.

According to implementations of the present disclosure, the content recommendation grading sub-module 206 is configured to grade one or more content recommendation pools. In an implementation, the content recommendation grading sub-module 206 may generate a general grade for the pooled content recommendations and a user-specific or personalized grade for a particular user based on the user identity data associated with the particular user as constrained by one or more content recommendation scopes for a user, as described in greater detail in connection with FIGS. 3 and 4. In an implementation, based on the grades assigned to the multiple candidate content recommendations, the content recommendation grading sub-module identifies one or more scoped content recommendations or scoped personalized content recommendations 251 that may be presented to a user (e.g., as a list).

Figure 3:
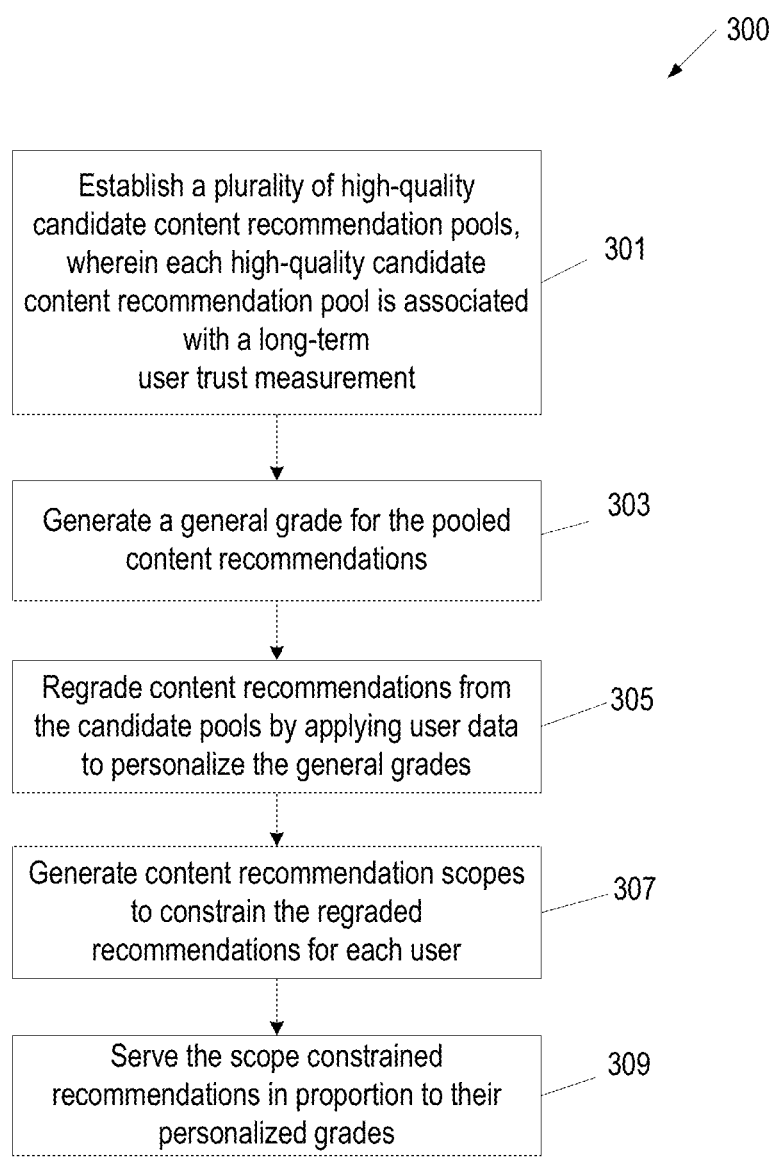
FIG. 3 is a flow diagram of an implementation of a method for serving personalized content recommendations, in accordance with various implementations.

FIG. 3 is a flow diagram of an exemplary implementation of a method 300 for analyzing user content identity profiles and their associated content recommendation scopes to generate personalized content recommendations from the content recommendation candidate pools for each user across multiple content serving locations and content usage scenarios. The method 300 may be performed by processing logic that may comprise hardware (circuitry, dedicated logic, etc.), software (such as is run on a general purpose computer system or a dedicated machine), or a combination of both. In an implementation, the method 300 may be performed by the content recommendation personalization module 145 hosted in a server 140 of FIG. 1 or by the content recommendation personalization module 200 illustrated in FIG. 2.

According to an implementation, method 300 includes creating and/or identifying personalized content recommendations by building multiple pools of high-quality content recommendation candidates (e.g., candidate content recommendations may be considered "high-quality" based on a measure of a previously determined click-through-rate (CTR) and the features they best represent), in block 301. The "best" or optimized content recommendations in the content network are aggregated into a plurality of sets of content recommendation candidate pools, each pool being distinguished or classified based on a "user trust measurement" or a "user trust measures" or a "long-term user trust measurement", such as, for example, a user engagement measure, a high content recommendation quality metric, or based on a document property (e.g., the type or category of the document).

In an implementation, qualitative user trust measures may be determined based on one or more user trust signals identified at one or more of the following levels: a user level (e.g., based on the user profile, user action or activity history, an associated user cluster, etc.); a document level (e.g., a trustworthiness associated with the document, whether the document is considered evergreen content, etc.); and a source or context level (e.g., which section of a website the document appears in, a category associated with publisher source, a publisher, a language, a time of day, a day of the week, etc.).

In an implementation, the user trust measures may include, but are not limited to, one or more of the following: on-page user behavior events like scrolling and duration; average duration of user sessions on a content publisher's website; the number of documents/articles the user has viewed per session; the number of comments on an article; the percentage of article comments read by users; the number of return visits by the user to the content publisher's website over time in association with clicks by the user on the content recommendations provided on the content publisher's website; an indicator of content sharing by the user (e.g., copying the document's/article's URL by the user or clicking on the article's "share" button); a measure of the CTR associated with a document; the number of reads to end of article; an "evergreen" content recommendation associated with each document category; a best CTR by location; the number of document content recommendations or "likes" by other users, etc.

In an implementation, the system creates sets of pools of high-quality content recommendation candidates, each pool being associated with a long-term user trust measurement. From the list of these sets of content recommendation candidate pools the system may match and choose suitable content recommendation candidates for each user profile. Advantageously, a scalable platform is provided for experimentation with different content recommendation candidate pools in order to increase long-term user trust and engagement. The network-wide dispersal of the resulting content recommendation impressions affords valuable feedback and data on the quality of the content recommendations that can be used by the content recommendation service provider to further enrich and optimize the candidate content recommendation pools.

In one implementation, from a network-wide "whitelist" of content sources (i.e., content cleared by publishers for sharing on the content recommendation network), multiple types of high-quality candidate content recommendation pool sets may be generated. Such candidate content recommendation pool sets can include user trust signals or attributes that can be used to identify and cluster documents into the pool sets. Exemplary user trust signals or attributes may include: one or more "evergreen" content recommendations worldwide in English having a highest relative user engagement measure (e.g., CTR, maintaining user interest over a long time period); content recommendations with the highest relative CTR for a particular geographic location and language; content recommendations with the highest relative CTR for a category and language; content recommendations with the highest relative CTR or RPM in a user cluster; content recommendations that have been allocated differing user trust thresholds for different classifications of users (e.g., classification of users by interests); and trending topics for a specific geographic location.

In an implementation, grades in each pool are normalized between sources. For example, a set of content recommendations may be generated, each with a prior grade and the set of "features" it was selected for (geography, category, source, etc.). Each document may also be tagged with a plurality of content recommendation pool metadata tags that can be used by the system to quickly generate new combinations and categories of content recommendation pools, if necessary.

In block 303, according to an implementation, a general grade may be generated for the set of all possible content recommendations in the pool based on one or more of a prior grade associated with the particular content recommendation and a user engagement measurement (e.g., CTR). In an embodiment, a prior grade is generated for the content recommendation. In an implementation, one or more content recommendations may be preselected based on previous performance in the network. In an implementation, a content recommendation's prior grade may represent an estimate of how well a content recommendation may perform in the future.

In an implementation, the general grade is based on an online-CTR for a particular content recommendation derived from aggregated user data associated with the network. In an embodiment, the current grade for a content recommendation is a combination of the prior grade and the actual CTR. The general grades may be personalized by assigning weights to the content recommendation pools in proportion to the user profile interest data that matches those pools. For example, if a user consistently chooses "evergreen" content over CTR driven content, the user may be associated with an "evergreen" content recommendation pools as a source of potential content recommendation candidates.

In block 305, according to implementations of the present disclosure, personal information associated with a particular user (e.g., one or more personal weights/constraints) may be considered in order to generate a personalized grade for a particular user. In implementations, the personalized grade may be an update, change, adjustment, re-calculation of the general grade in view of the personal information associated with the particular user. In an implementation, an actual CTR may be calculated for each content recommendation in the source. The actual CTR may then be combined with a prior grade associated with the content recommendation. In an embodiment, the user profile may be identified based on the cookie information and the user registration information. The grade for a content recommendation may then be re-graded or re-calculated in view of the user profile information.

In block 307, in an implementation, one or more content recommendation scopes may be generated to constrain the re-graded content recommendations for each user, in block 307. According to implementations of the present disclosure, a content recommendation scope is a content recommendation filter that presents the user with content recommendations conforming to the user's chosen scopes (also referred to as "scoped content recommendations"). In an implementation, the content recommendations may be filtered by one or more content recommendation scope parameters, such as, for example, by features the content recommendation was selected by (e.g., categories the user saw, user geographic location, scope preferences explicitly chosen or dismissed by the user, etc.).

In an implementation, a content recommendation may be filtered by its properties (e.g., categories, the content recommendation pool it came from, sources), the user properties (e.g., categories, geographic location, sources) and/or the current content recommendation scope the user is located within (e.g., information associated with a current web site or document that the user is consuming).

In an implementation, a "relevance-to-user" measure associated with a particular content recommendation may be assigned on a per user basis to multiple users, for example, based on the best CTR/RPM in a user cluster from its profile. In an embodiment, a personalized grade generated in block 305 may be represented by the following expression:

personal_grade=relevance_to_user*general_grade

In block 309, according to an implementation of the present disclosure, content recommendations are then served to users in proportion to their personalized grades, as filtered by the user's content recommendation scopes in block 307 (as described below in detail with reference to FIG. 4).

Figure 4:
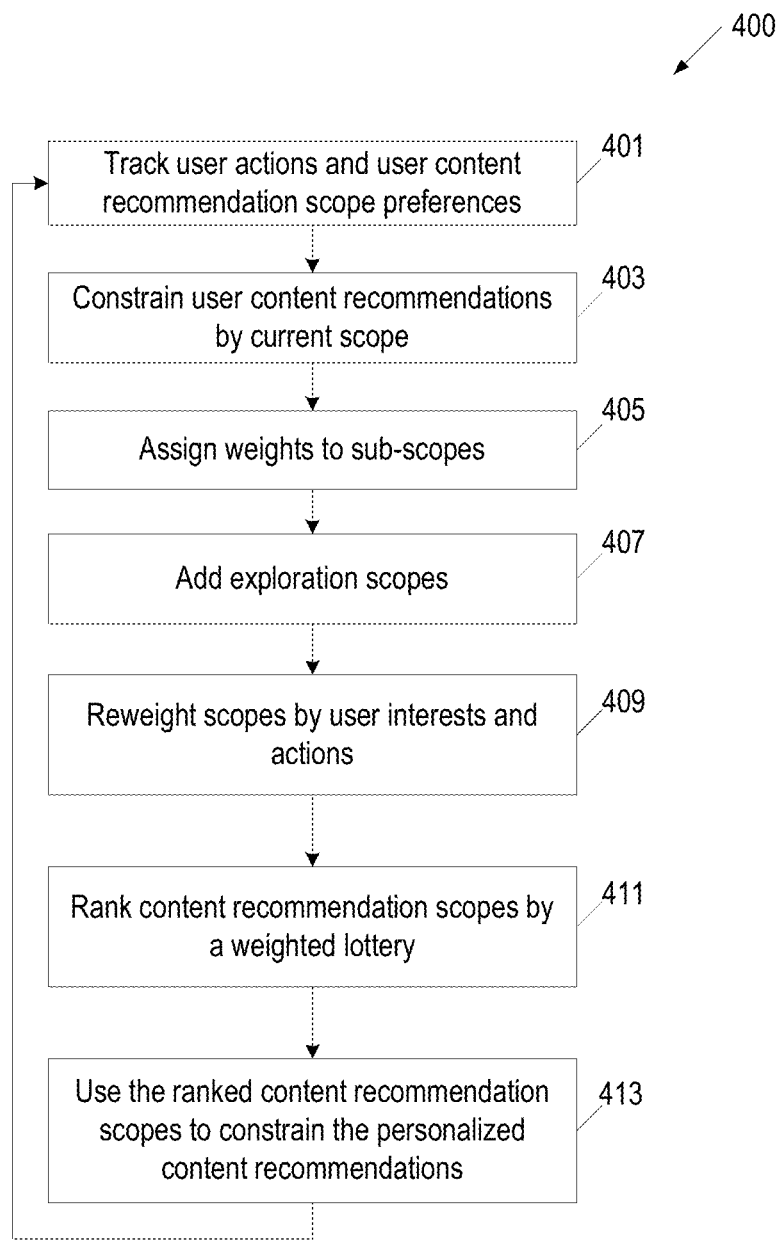
FIG. 4 is a flow diagram of an implementation of a method for generating content recommendation scopes for users, in accordance with various implementations.

FIG. 4 is a flow diagram of an exemplary implementation of a method 400 for using ranked content recommendation scopes to constrain personalized content recommendations, according to implementations of block 307 of FIG. 3. The method 400 may be performed by processing logic that may comprise hardware (circuitry, dedicated logic, etc.), software (such as is run on a general purpose computer system or a dedicated machine), or a combination of both. In an implementation, the method 400 may be performed by the content recommendation personalization module 145 hosted in a server 140 of FIG. 1 or by the content recommendation personalization module 200 illustrated in FIG. 2.

In an implementation, content recommendation scopes comprise a content taxonomy optimized to organize and constrain the served content recommendation entities (e.g., by source, category, topic, author, algorithm type etc.). This results in a themed stream of content being provided for personalized browsing by the user. In block 401, user data associated with a user's action (e.g., a user's click on a scope implies actual interest in reading more content from that content recommendation scope) is tracked and analyzed to identify current and potential user recommendation scope preferences.

In an implementation, users can employ explicit choices to configure the content recommendation scopes they prefer. The user can also delete or negate unwanted scopes, which will not be served to the user from then on. All such user preference data, including user scope preferences, are stored in the user content identity profile and accessed by the content recommendation system whenever necessary, in block 401.

In an implementation, personalized content recommendations of scopes are generated by matching the user content profile (and its associated user tracking cookie) to content recommendation scopes that might interest the user. The selected personalized content recommendations are constrained based on a listing of ranked content recommendation scopes (wherein the ranked content recommendation scopes include exploration scopes, sub-scopes, current scope), in block 403. A current scope marks the user's location in a category. Exemplary content recommendation scopes include, but are not limited to: a category and sub category (e.g., "Tech"); a publisher and source (e.g., "CNN"); a topic (e.g., "Miley"), an algorithm, an author, a brand, etc.

Content recommendation scopes may be selected according to one or more selection rules, such as for example: recommending categories based on previously visited categories (e.g., if user has previously visited these categories, whether explicitly, or implicitly by viewing documents, show these categories, selected by weight); recommending categories and super categories based on current scope (e.g., super category vs. category) and previously visited categories (e.g., identifying previously visited super categories from visited categories); recommending related categories (e.g., by using a static or dynamic relation matrix) to categories visited by user; recommending categories using multiple algorithms (e.g., exploration, based on user interests, related to content, related to user interests, collaborative filtering, clustering and other algorithms). In an implementation, one or more algorithms may be used to provide a confidence measure for itself, so the resulting content recommendation scopes can be weighted accordingly. Given more data about the user, the weight assigned to personal algorithms increases incrementally, with the weight assigned to contextual or exploration algorithms decreasing in proportion.

Additionally, an exploration algorithm (e.g., popular, trending, editor pinned content etc.) allows surfacing new content recommendation scopes for the user to explore. The user's implicit interactions with the surfaced exploration content recommendation scopes (e.g., 10 content recommendation scopes with different weights) generate accurate and valuable data on what the user really wants to read. The exploration content recommendation scopes can also be used to learn about the reading preferences of new readers, for whom there is insufficient historical data.

In an implementation, a content recommendation scope may be generated based on one or more of the following inputs: a document currently being viewed by the user (for which to show content recommendations); a source of the document; a UUID (from the user tracking cookie or user content profile); one or more current scopes; a number of scopes from each type to recommend; user interests data (taken from the user tracking cookie, e.g., visited categories and sources). Based on one or more of these inputs, a list of suggested content recommendation scopes is generated.

In one embodiment, as illustrated in FIG. 4, the method for serving content recommendation scopes may include one or more of the following operations: making a list of scopes with counts/weights (<EScope,String>⇒Integer/Float); filling counts from the user tracking cookie; removing scopes deleted by the user.

In an implementation, in block 403, the method may further include adding a current scope to counts according to one or more of the following rules: if the current scope is a category, adding the category with a predefined weight (e.g., 15), and also adding it's super category with predefined weight (e.g., 10); if the current scope is a super category, adding it's categories with predefined weights (e.g., 3), in block 405.

In an implementation, in block 407, one or more exploration or experimental scopes may be added (e.g., 3N exploration scopes) for exploration each with total predefined weight (e.g., 1). In an implementation, in block 409, user content consumption data from the user taste profile graph is used to reweight the list of scopes in proportion to the percentage of the user's consumption of different content types as recorded in the user taste profile graph. In an implementation, the system may pick a number of scopes (e.g., N scopes), which can be categories, super categories, etc., by a weighted lottery, in block 411. In block 413, the weighted content recommendation scopes may be used to filter the graded content recommendations.

FIG. 5 illustrates a content recommendation widget associated with a content article on a publisher website presents the user with the option of clicking on any of the content recommendations as well as with options to re-categorize the content recommendations by scope and register for the content recommendation network directly.

Figure 6:
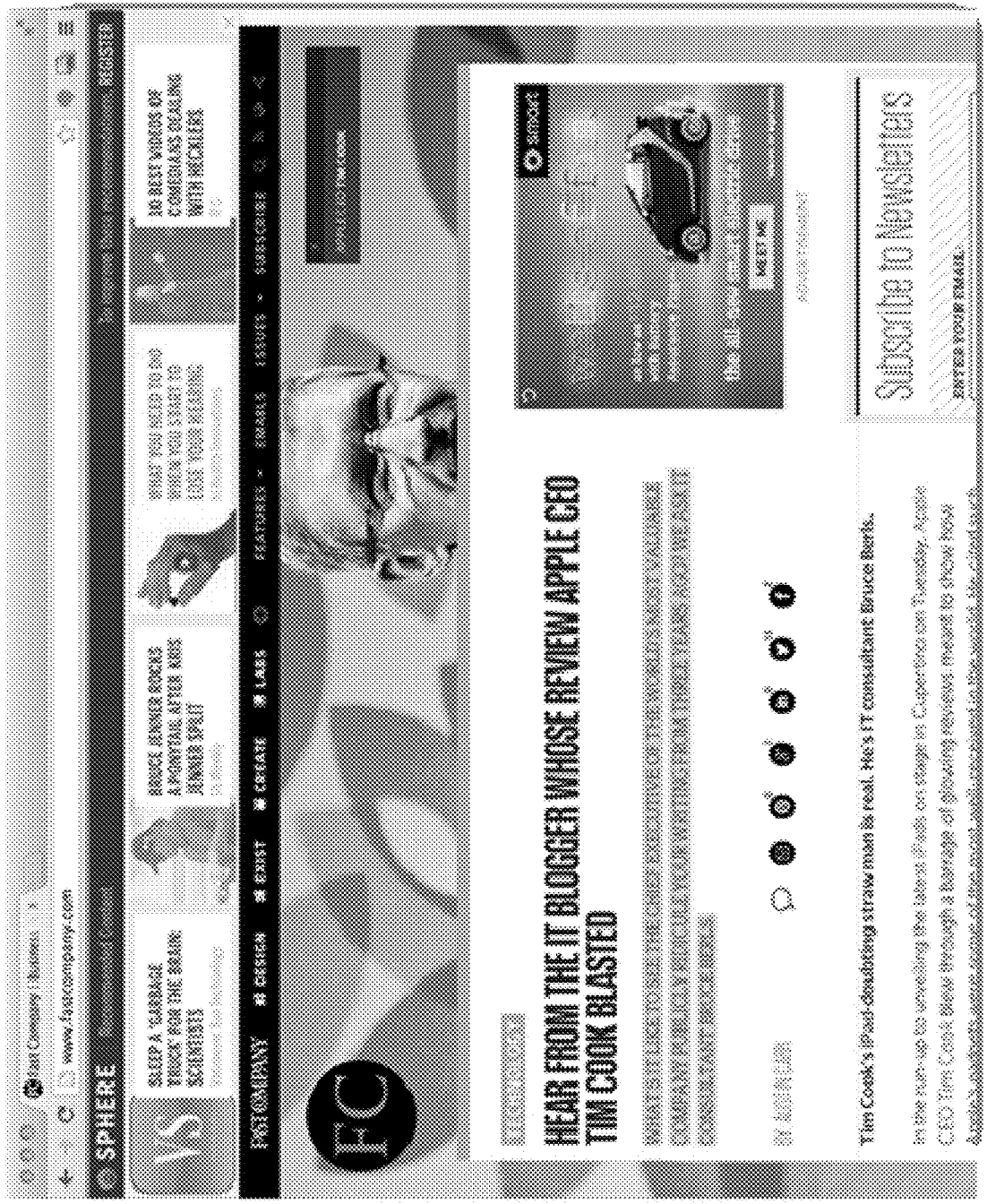
FIG. 6 is an exemplary screenshot of a content recommendation webpage frame, in accordance with various implementations.
Figure 7:
FIG. 7 is an exemplary screenshot of a content recommendation personalization hub front page, in accordance with various implementations.

FIG. 6 is an exemplary screenshot of a content recommendation webpage frame, according to implementations of the present disclosure. FIG. 7 is an exemplary screenshot of a content recommendation personalization hub front page.

Figure 8:
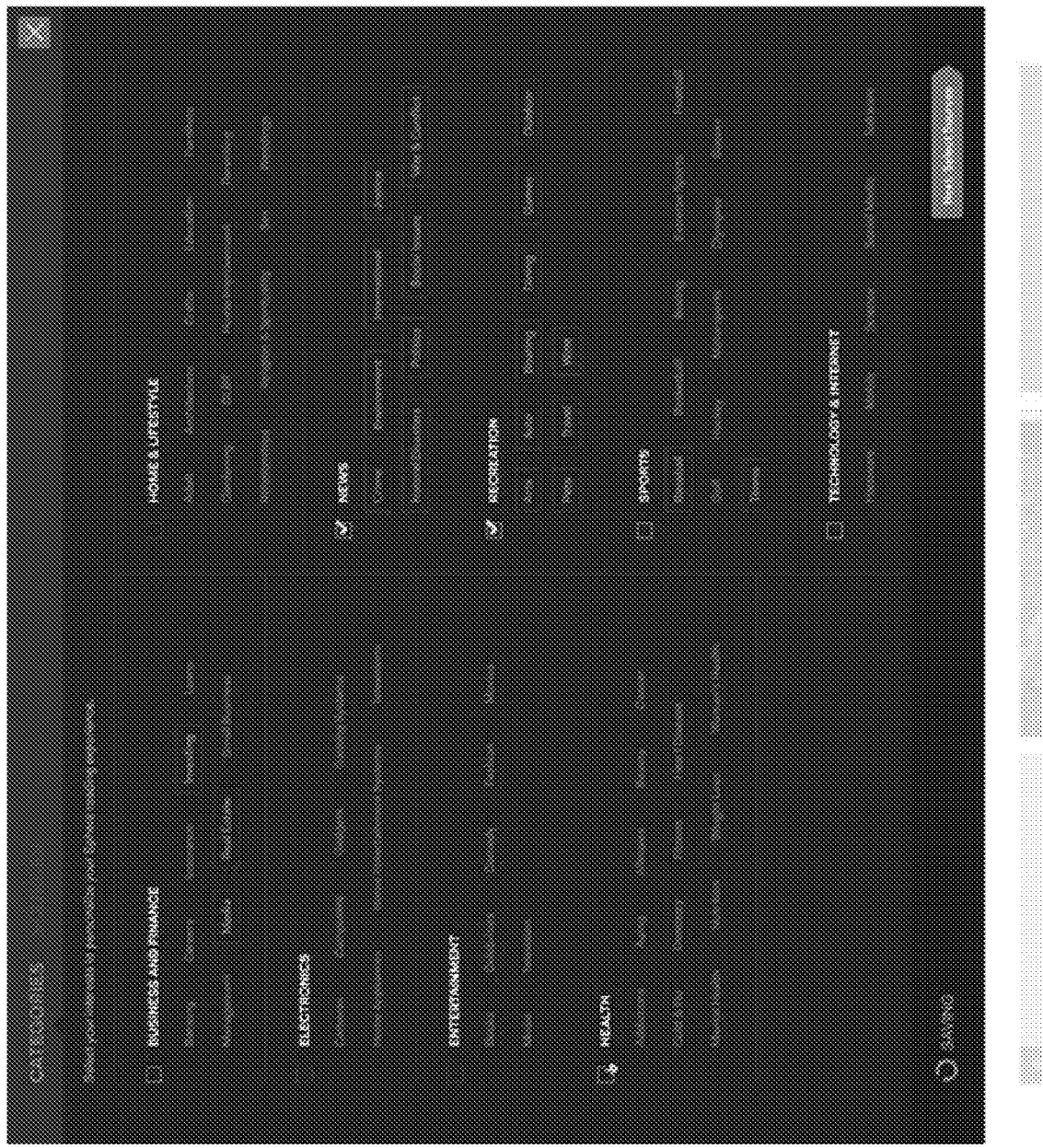
FIG. 8 is an exemplary screenshot of a content recommendation scope (e.g., a category), in accordance with various implementations.
Figure 9:
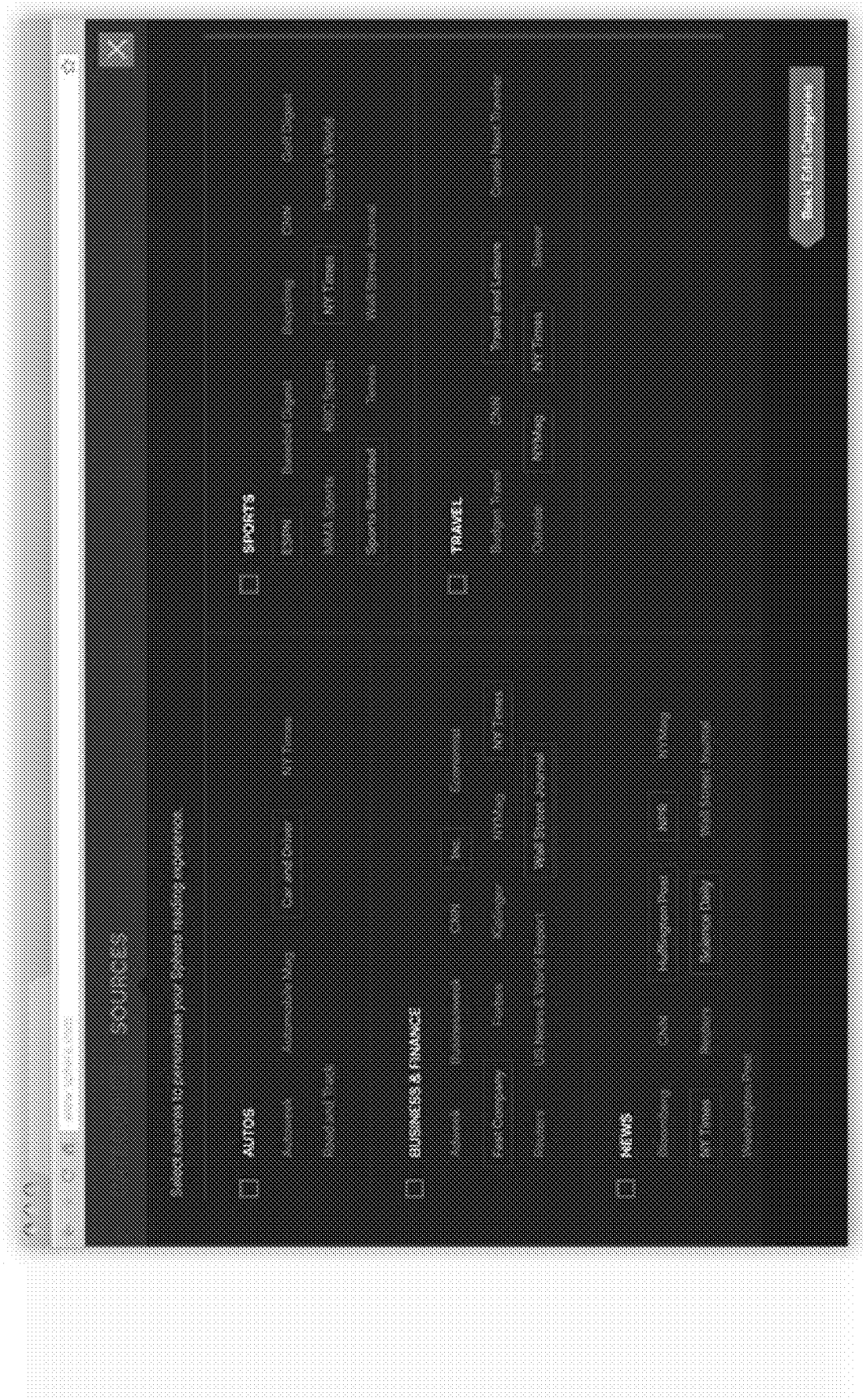
FIG. 9 is an exemplary screenshot of a content recommendation scope (e.g., a document source), in accordance with various implementations.
Figure 10:
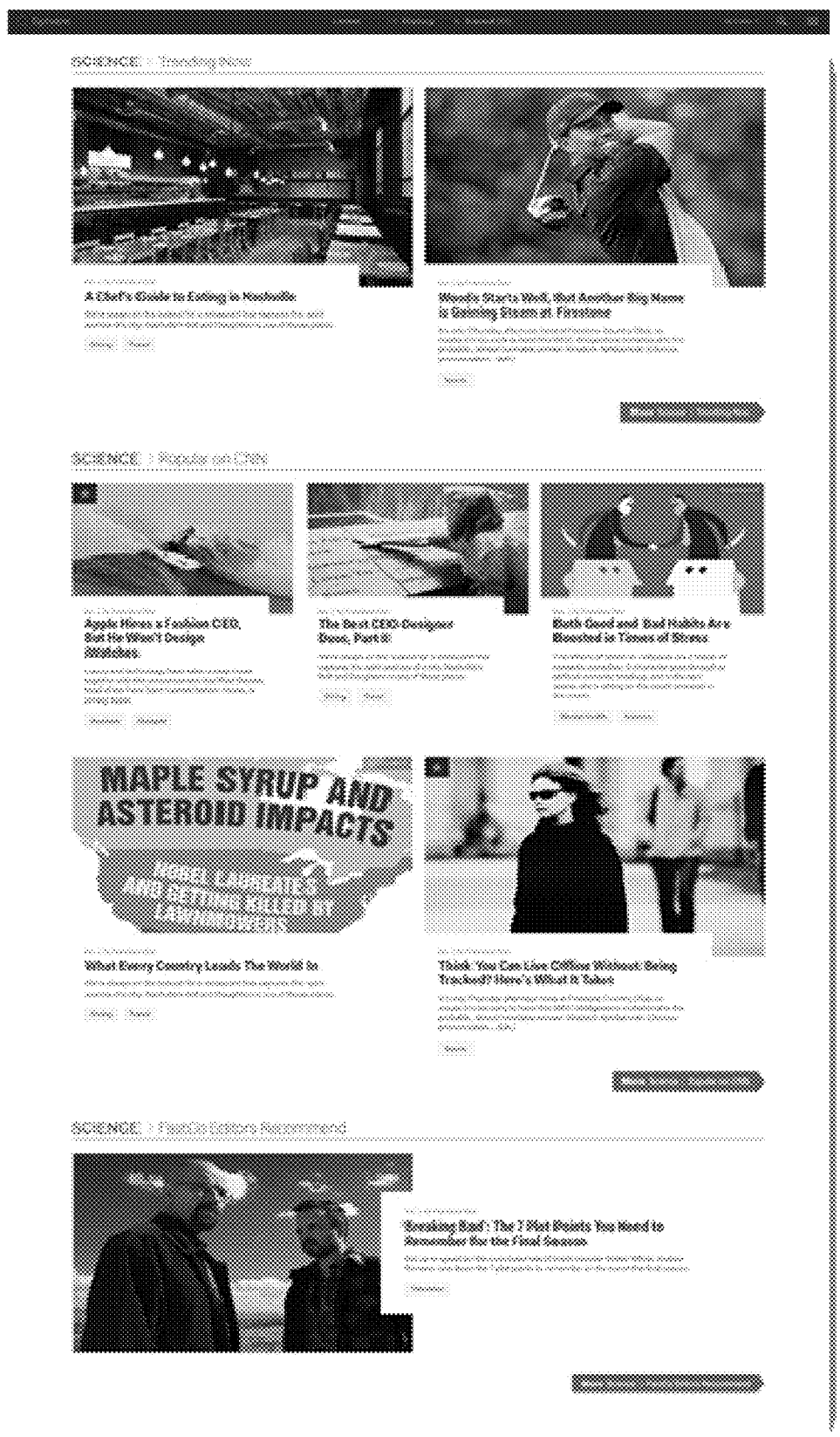
FIG. 10 is an exemplary screenshot of a scoped content recommendation display stream, in accordance with various implementations.
Figure 11:
FIG. 11 is an exemplary screenshot of a content recommendation extension or add-on for a web browser, in accordance with various implementations.

FIG. 8 is an exemplary screenshot of a content recommendation scope (e.g., a category such as "Business and Finance," "Electronics," "Entertainment," etc.). FIG. 9 is an exemplary screenshot of a content recommendation scope based on a document source. FIG. 10 is an exemplary screenshot of a scoped content recommendation display stream. FIG. 11 is an exemplary screenshot of a content recommendation extension or add-on for a web browser.

FIG. 12 is an exemplary screenshot of a content recommendation widget (post-registration—such that it is personalized for a particular user (e.g., Yaron Galai)).

According to implementations of the present disclosure, a framed webpage article provides another option for browsing the personalized content recommendations. Webpage frames can have several locations on a web page (e.g., a header, footer or right rail). A webpage frame provides the user with several options for navigation and clicking. The user can navigate through any of the actual links within the article template or engage directly with the frame. The functionality within the frame can mirror the content recommendation widget, with the user having the option of clicking on recommended content (e.g., the frame can be persistent from document to document), sorting the recommendations based on a user input (e.g., show more recommendations in the "Technology" category, etc.). Users can register for the content recommendation network directly in the frame or navigate to the personalization hub homepage (e.g., by clicking the content recommendation network logo on the frame). Users can also access their personalized content recommendations by browsing the personalization hub homepage, which has a specific URL (e.g., http://www.sphere.com). On the personalization hub homepage the user has several options to engage with content—e.g., clicking directly on recommended content or one of the navigation branches (e.g., topics, entities, sources) will send them into a "sub-branch" (e.g., sphere.com/science) with content recommendations specific to that given topic. In an implementation, a user can download a content recommendation extension or add-on to their web browser to invoke the content discovery experience at will throughout their web surfing.

Figure 14:
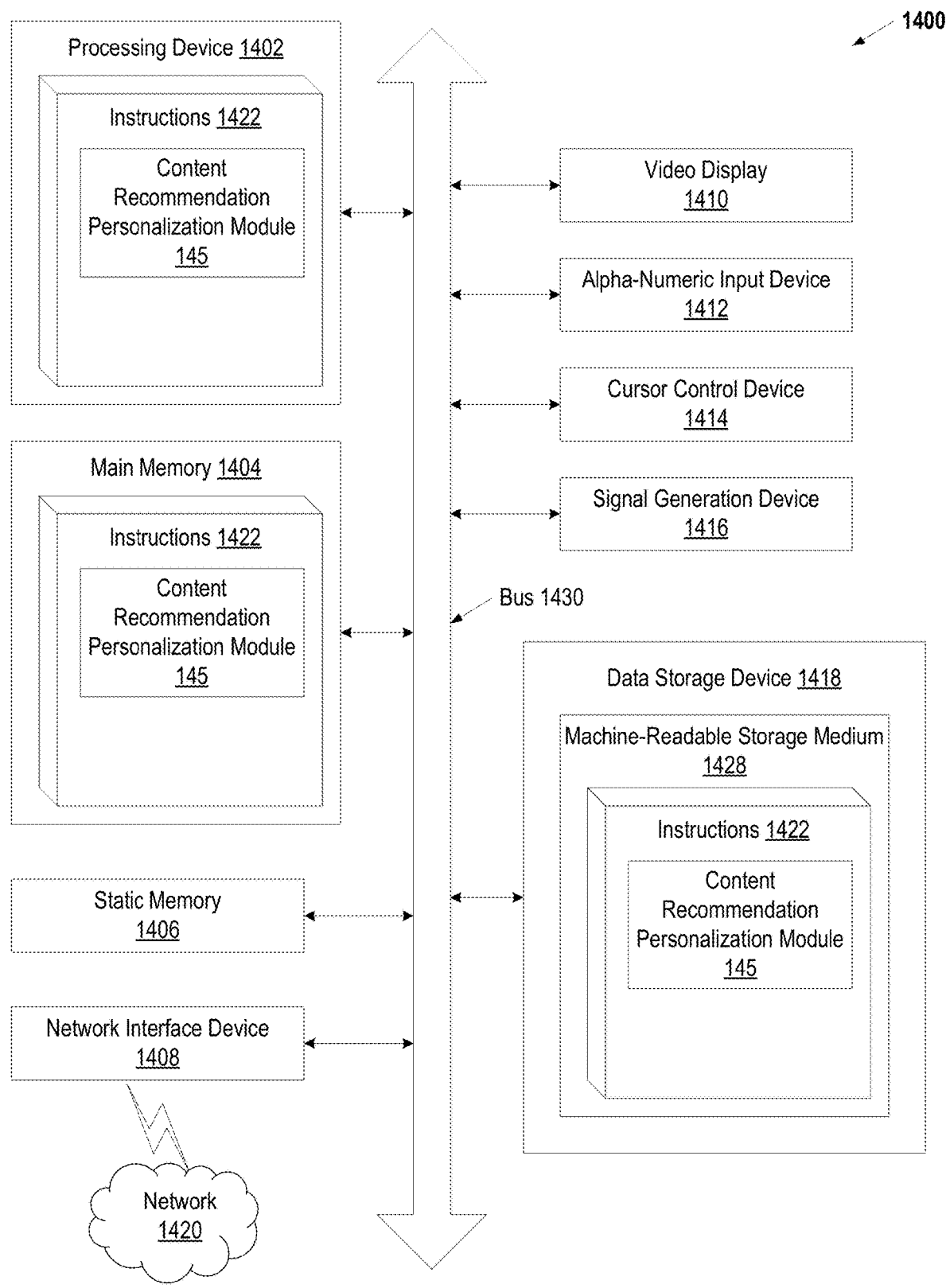
FIG. 14 is a block diagram of an example computer system that may perform one or more of the operations described herein, in accordance with various implementations.

FIG. 14 is a block diagram of an example computer system 1400 that may perform one or more of the operations described herein, in accordance with various implementations. In alternative implementations, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1400 includes a processing device (e.g., a processor) 1402, a main memory 1404 (e.g., read-only memory (ROM), flash memory, dynamic random access memory (DRAM) such as synchronous DRAM (SDRAM), double data rate (DDR SDRAM), or DRAM (RDRAM), etc.), a static memory 1406 (e.g., flash memory, static random access memory (SRAM), etc.), and a data storage device 1414, which communicate with each other via a bus 1430.

Processor 1402 represents one or more general-purpose processing devices such as a microprocessor, central processing unit, or the like. More particularly, the processor 1402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 1402 may also be one or more special-purpose processing devices such as an application specific integrated circuit (ASIC), a field programmable gate array (FPGA), a digital signal processor (DSP), network processor, or the like. The processor 1402 is configured to execute instructions 1422 for performing the operations and steps discussed herein.

The computer system 1400 may further include a network interface device 1404. The computer system 1400 also may include a video display unit 1410 (e.g., a liquid crystal display (LCD) or a cathode ray tube (CRT)), an alphanumeric input device 1412 (e.g., a keyboard), a cursor control device 1414 (e.g., a mouse), and a signal generation device 1416 (e.g., a speaker).

The data storage device 1414 may include a computer-readable storage medium 1424 on which is stored one or more sets of instructions 1422 (e.g., software) embodying any one or more of the methodologies or functions described herein. The instructions 1422 may also reside, completely or at least partially, within the main memory 1404 and/or within the processor 1402 during execution thereof by the computer system 1400, the main memory 1404 and the processor 1402 also constituting computer-readable storage media. The instructions 1422 may further be transmitted or received over a network 1420 via the network interface device 1408.

In one implementation, the instructions 1422 include instructions for an optimization module (e.g., content recommendation personalization module 145 in FIG. 1) and/or a software library containing methods that call the optimization module. While the computer-readable storage medium 1428 (machine-readable storage medium) is shown in an exemplary implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "collecting", "establishing", "generating", "identifying", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

For simplicity of explanation, the methods are depicted and described herein as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Certain implementations of the present disclosure also relate to an apparatus for performing the operations herein. This apparatus may be constructed for the intended purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Reference throughout this specification to "one implementation" or "an implementation" means that a particular feature, structure, or characteristic described in connection with the implementation is included in at least one implementation. Thus, the appearances of the phrase "in one implementation" or "in an implementation" in various places throughout this specification are not necessarily all referring to the same implementation. In addition, the term "or" is intended to mean an inclusive "or" rather than an exclusive "or." Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion.

The terms "first", "second", "third", "fourth", etc. as used herein are meant as labels to distinguish among different elements and may not necessarily have an ordinal meaning according to their numerical designation.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A system comprising:
a memory comprising instructions; and
a processing device operatively coupled to the memory, the processing device to execute the instructions to:
establish a plurality of content recommendation sets, wherein each of the plurality of content recommendation sets comprises a plurality of content recommendations each associated with a long-term user engagement measurement, wherein a first content recommendation set is associated with a first long-term user engagement measurement indicating a first click through rate (CTR) for a first geographic location;
generate a first grade associated with each of a first plurality of content recommendations in the first content recommendation set;
generate a user profile associated with a first user, wherein the user profile comprises registration information provided by the first user executing PA an online registration process;
collect activity information associated with the first user, wherein the activity information indicates the first user is associated with the first geographic location;
generate a second grade associated with each of the plurality of content recommendations in the first content recommendation set, wherein the second grade is generated by adjusting the first grade in view of the registration information associated with a user login and the activity information;
identify a first content recommendation of the plurality of content recommendations based on the second grade; and
cause a display of the first content recommendation to the first user.

2. The system of claim 1, the processing device to execute the instructions to:
receive a selection of a set of one or more content recommendation sources.

3. The system of claim 2, wherein at least a portion of the plurality of content recommendation sets are identified based on the selection of the set of one or more content recommendation sources.

4. The system of claim 1, wherein adjusting the first grade in view of the registration information and the activity information comprises multiplying the first grade by a ratio of CTR over revenue per 1,000 impressions (RPM).

5. The system of claim 1, wherein the first grade associated with the first content recommendation is determined in view of an online CTR derived from aggregated user data associated with the first content recommendation.

6. A method comprising:
classifying, by a processing device, a first content recommendation set of a plurality of content recommendation sets based on a first user trust measurement;
generating, based on aggregated user data relating to the first user trust measurement, a first grade associated with a first content recommendation in the first content recommendation set;
generate a user profile associated with a first user, wherein the user profile comprises registration information provided by the first user executing an online registration process;
collecting activity information associated with the first user, wherein the activity information indicates the first user is associated with the first user trust measurement;
generating a second grade by adjusting the first grade in view of the registration information associated with a user login and the activity information; and
causing, based on the second grade, a display of the first content recommendation to the first user.

7. The method of claim 6, further comprising receiving a selection of a set of one or more content recommendation sources.

8. The method of claim 7, wherein at least a portion of the plurality of content recommendation sets are identified based on the selection of the set of one or more content recommendation sources.

9. The method of claim 6, wherein the first user trust measurement comprises a CTR corresponding to at least one of: a geographic location, a language, a content category, a user cluster, an interest, or a topic.

10. The method of claim 6, wherein the first user trust measurement is based at least in part on at least one of: one or more user profiles, activity information corresponding to one or more users, a trustworthiness associated with one or more webpages, a source of one or more content recommendations, a section of a webpage corresponding to one or more content recommendations, a category associated with a source of one or more content recommendations, a time of day, or a day of a week.

11. The method of claim 6, wherein the first user trust measurement comprises at least one of: a level of on-page scrolling by a user, a duration of time spent on a webpage, an average duration of user sessions associated with a web site, a quantity of documents viewed per online session; a quantity of comments corresponding to content of a webpage; a percentage of comments corresponding to a webpage read by one or more users; a quantity of return visits by a user to a webpage over a period of time, a quantity of clicks by one or more users on a link provided on a webpage; an indicator of content sharing by a user, a measure of CTR associated with a document; a quantity of instances that one or more users read to an end of an article, or a quantity of positive indications by one or more users.

12. The method of claim 6, each of a plurality of content recommendations of the first content recommendation set is tagged with one or more metadata tags corresponding to an attribute of a respective content recommendation.

13. The method of claim 6, wherein the first grade associated with the first content recommendation is determined in view of an online CTR derived from the aggregated user data associated with the first content recommendation.

14. A non-transitory computer-readable storage medium comprising executable instructions that, if executed by a processing device, cause the processing device to:
    establish a plurality of content recommendation sets, wherein a first content recommendation set of the plurality of content recommendation sets is associated with a first user trust measurement associated with at least one of: a geographic location, a language, a content category, a user cluster, an interest, or a topic;
    generate a first grade associated with each of a first plurality of content recommendations in the first content recommendation set;
    generate a user profile associated with a first user, wherein the user profile comprises registration information collected by an online registration of the first user;
    collect, by an online activity tracking cookie, activity information associated with the first user, wherein the activity information indicates the first user is associated with the first geographic location;
    generate a second grade associated with each of the plurality of content recommendations in the first content recommendation set, wherein the second grade is generated by adjusting the first grade in view of the registration information identified in view of a login by the first user using identity information associated with a third-party system and the activity information; and
    identify a first content recommendation of the plurality of content recommendations based on the second grade.

15. The non-transitory computer-readable storage medium of claim 14, the processing device to receive a selection of a set of one or more content recommendation sources.

16. The non-transitory computer-readable storage medium of claim 14, wherein at least a portion of the plurality of content recommendation sets are identified based on the selection of the set of one or more content recommendation sources.

17. The non-transitory computer-readable storage medium of claim 14, each of a plurality of content recommendations of the first content recommendation set is tagged with one or more metadata tags corresponding to an attribute of a respective content recommendation.

18. The non-transitory computer-readable storage medium of claim 14, wherein the first grade associated with the first content recommendation is determined in view of an online CTR derived from aggregated user data associated with the first content recommendation.

19. The non-transitory computer-readable storage medium of claim 14, wherein the activity information is collected at least in part by one or more activity tracking cookies.

20. The non-transitory computer-readable storage medium of claim 14, wherein the registration information comprises a user preference indicating one or more filters to apply to the plurality of content recommendation sets.

* * * * *

UNITED STATES PATENT AND TRADEMARK OFFICE
CERTIFICATE OF CORRECTION

| | |
|---|---|
| PATENT NO. | : 10,693,981 B2 |
| APPLICATION NO. | : 16/119262 |
| DATED | : June 23, 2020 |
| INVENTOR(S) | : Yaron Galai et al. |

Page 1 of 1

It is certified that error appears in the above-identified patent and that said Letters Patent is hereby corrected as shown below:

On the Title Page

Item (72) Inventor: Daniel Stern Sternlicht
Should be: Daniel Sternlicht

Signed and Sealed this
Eighteenth Day of August, 2020

Andrei Iancu
*Director of the United States Patent and Trademark Office*